J. R. MACDONALD.
WATER CIRCULATING MEANS FOR AUTOMOBILES.
APPLICATION FILED JULY 3, 1915.
1,167,509.
Patented Jan. 11, 1916.
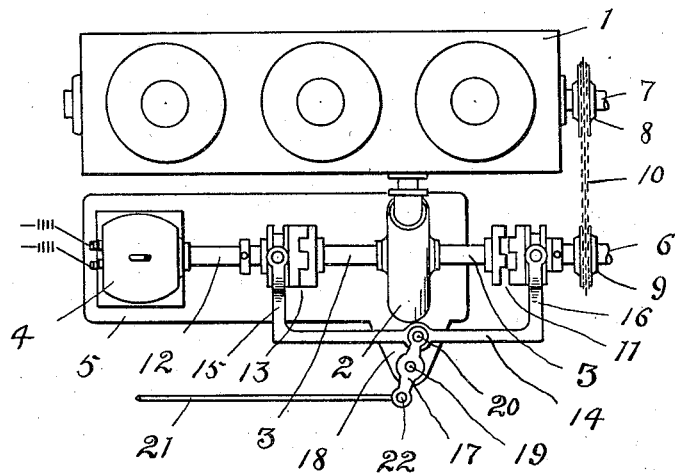
WITNESSES:
Albert H. Schildt.
L. B. Watts.
INVENTOR.
J. R. Macdonald
BY Geo. Stevens.
ATTORNEYS.

UNITED STATES PATENT OFFICE.

JAMES ROBB MACDONALD, OF DULUTH, MINNESOTA.

WATER-CIRCULATING MEANS FOR AUTOMOBILES.

1,167,509.   Specification of Letters Patent.   Patented Jan. 11, 1916.

Application filed July 3, 1915. Serial No. 38,007.

*To all whom it may concern:*

Be it known that I, JAMES R. MACDONALD, a subject of the King of Great Britain, residing at Duluth, in the county of St. Louis and State of Minnesota, have invented certain new and useful Improvements in Water-Circulating Means for Automobiles, of which the following is a specification, reference being had therein to the accompanying drawing.

This invention relates to water circulating means for internal combustion engines and applies especially to such engines used on selfpropelled vehicles such as automobiles and the like.

The object of the invention is to produce such a device whereby the engine jacket water may be freely circulated irrespective of the operation of the engine.

Another object is to produce such a choice whereby the water may be circulated either by the engine when in operation or by auxiliary power furnished indirectly by the engine.

Referring now to the drawing forming part of the application, and in which like figures of reference indicate like parts the figure is a diagrammatic plan view of my improved device installed adjacent an engine.

1 represents an internal combustion engine, the use of which upon selfpropelled vehicles, such as automobiles, is well understood.

2 represents a water circulating centrifugal pump, the discharge and intake pipes of which may be connected to the water jacket of the engine in any desired manner, and which varies according to the make and type of engine. The shaft 3 operates the runners of the pump 2 and is, in turn, operated either by the engine direct, or by an auxiliary electric motor 4, preferably installed upon a suitable base 5, with the pump 2. A countershaft 6 is suitably journaled concentric with the shaft 3 and is driven continuously by the engine shaft 7 when the latter is in motion, it being operatively connected thereto by means of the sprockets 8 and 9 and the chain 10. A clutch 11 is installed upon the abutting ends of the shafts 3 and 6, one half of which is connected to the shaft 3 and the other half to the shaft whereby when the clutch 11 is thrown into engagement, the pump 2 is operated by the direct action of the shaft 6, which as before stated, derives its power from the engine shaft 7.

The electric motor shaft 12 is arranged concentric with the pump shaft 3, and abuts the end thereof opposite to that upon which the clutch 11 is mounted. A clutch 13, identical with the clutch 11, is mounted upon the abutting ends of the shafts 12 and 3 and which when thrown into engagement, operatively connects the shafts 12 and 3, whereby, when the clutch 11 is out of engagement, the pump may be operated by the electric motor 4. A rod 14, having right angle end extensions 15 and 16 which are operatively connected to the clutches 11 and 13, and which connection is common in such clutches, is operated longitudinally by means of the pivoted lever 17 supported upon the extension 18 of the base 5, at 19, the lever being pivotally connected to the rod 14 at 20. An operating rod, 21 is connected at 22 to the lever 17, and may lead to any desired point in the automobile, readily accessible to the operator, and whereby the clutches may be controlled.

The electro-motive force for the motor 4 may be supplied in any desired manner, as for instance, a storage battery carried by the automobile and which is commonly used on such vehicles.

It is understood that various modifications in arrangement of parts, to suit individual circumstances, may be resorted to without departing from the spirit of the invention.

Thus I have produced means whereby the jacket water of an engine may be freely circulated independent of the operation of the engine and either by the engine direct or by an auxiliary motor, as desired, it being understood that other forms of auxiliary power than electricity might be employed with good results.

When it is desired to connect the circulating pump 2 direct to the engine 1, the rod 21 is thrust in a direction to operatively engage the clutch 11 and disengage the clutch 13, which will connect the pump direct to the engine, and cause the former to be continuously operated so long as the engine is operated.

In the event of wanting the engine stopped, as for instance during a time when the automobile is at rest, the rod 21 may be placed in the position to operatively engage the clutch 13 and disengage the clutch 11 as illustrated in the drawing, when the pump may be operated by the motor 4 as desired.

By this device, it is evident that water may be kept circulating through the engine jacket at less expense and annoyance than by operating the engine therefor, and that such a device is advantageous both for an extreme cold or hot climate.

Having thus described my invention, what I claim as new and desire to secure by Letters Patent is:—

1. In water circulating means for an internal combustion engine, the combination with the engine of a circulating pump and means whereby the circulating pump may be operated either by the engine or by auxiliary power independent of the engine.

2. Water circulating means for internal combustion engines, comprising a pump installed adjacent the engine and having water connections therewith, an auxiliary source of power operatively connected to the pump and means whereby the pump may be operated either by the engine or by the auxiliary power.

3. The combination with an internal combustion engine of a water circulating pump, an auxiliary motor, means for connecting or disconnecting the motor to the pump and means for connecting or disconnecting the engine to the pump, whereby the pump may be operated either by the engine or the auxiliary motor.

4. The combination with an internal combustion engine, of a water circulating pump, a counter shaft, means for operating the counter shaft from the engine shaft, adjustable means for operating the pump from the counter shaft, an auxiliary motor and adjustable means for operating the pump from the auxiliary motor, whereby the pump may be operated either by the engine or by the motor.

In testimony whereof I hereunto affix my signature in the presence of two witnesses.

JAMES ROBB MACDONALD.

Witnesses:
W. H. DENHAM,
S. GEO. STEVENS.